(12) United States Patent
Takahashi et al.

(10) Patent No.: US 9,537,184 B2
(45) Date of Patent: Jan. 3, 2017

(54) LITHIUM ION SECONDARY BATTERY

(71) Applicant: Kabushiki Kaisha Toshiba, Minato-ku (JP)

(72) Inventors: Kenichi Takahashi, Kanagawa (JP); Hirokiyo Mamyoda, Nagano (JP); Kiyoshi Senoue, Nagano (JP); Tatsuya Hashimoto, Nagano (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 153 days.

(21) Appl. No.: 14/186,753

(22) Filed: Feb. 21, 2014

(65) Prior Publication Data

US 2014/0170450 A1 Jun. 19, 2014

Related U.S. Application Data

(63) Continuation of application No. PCT/JP2013/057450, filed on Mar. 15, 2013.

(30) Foreign Application Priority Data

Mar. 15, 2012 (JP) .................................. 2012-059024
Mar. 15, 2012 (JP) .................................. 2012-059025
Mar. 15, 2012 (JP) .................................. 2012-059026

(51) Int. Cl.
*H01M 10/50* (2006.01)
*H01M 10/637* (2014.01)
(Continued)

(52) U.S. Cl.
CPC ......... *H01M 10/5026* (2013.01); *H01M 2/145* (2013.01); *H01M 2/166* (2013.01);
(Continued)

(58) Field of Classification Search
None
See application file for complete search history.

(56) References Cited

U.S. PATENT DOCUMENTS 5,831,507 A * 11/1998 Kasamatsu .............. H01H 9/10
337/299
5,982,270 A * 11/1999 Wolfe, Jr. .............. H01H 37/76
337/165

(Continued)

FOREIGN PATENT DOCUMENTS

EP 2 393 145 A1 12/2011
JP 2001-312950 A 11/2001
(Continued)

OTHER PUBLICATIONS

Machine Translation of JP2001-352666 to Michiko et al.; Dec. 2001.*
(Continued)

*Primary Examiner* — Patrick Ryan
*Assistant Examiner* — Wyatt McConnell
(74) *Attorney, Agent, or Firm* — Oblon, McClelland, Maier & Neustadt, L.L.P.

(57) ABSTRACT

A lithium ion secondary battery of an embodiment includes: a battery can; an electrode assembly in the battery can formed by rolling up a positive electrode, a separator and a negative electrode; an organic electrolyte solution in the battery can; a positive electrode lead in the battery can connected to the positive electrode; a negative electrode lead in the battery can connected to the negative electrode; and an overcharge preventer in the battery can; a cap body sealing the battery can; a positive electrode terminal fixed to the cap body and connected to the positive electrode lead; and a negative electrode terminal fixed to the cap body and connected to the negative electrode lead.

12 Claims, 7 Drawing Sheets

(51) Int. Cl.
*H01M 2/34* (2006.01)
*H01M 10/052* (2010.01)
*H01M 2/14* (2006.01)
*H01M 2/16* (2006.01)
*H01M 10/0566* (2010.01)

(52) U.S. Cl.
CPC ........... *H01M 2/1686* (2013.01); *H01M 2/34* (2013.01); *H01M 10/052* (2013.01); *H01M 10/0566* (2013.01); *H01M 2200/103* (2013.01); *Y02E 60/122* (2013.01); *Y02P 70/54* (2015.11)

(56) References Cited

U.S. PATENT DOCUMENTS

| | | | |
|---|---|---|---|
| 6,060,185 A | 5/2000 | Okutoh | |
| 6,322,921 B1 | 11/2001 | Iwaizono et al. | |
| 6,741,159 B1* | 5/2004 | Kuczynski | H01H 37/002 337/142 |
| 2008/0116851 A1* | 5/2008 | Mori | H01M 2/34 320/134 |
| 2008/0191833 A1* | 8/2008 | Heathcote | H02H 5/047 337/298 |
| 2011/0104525 A1 | 5/2011 | Kim et al. | |
| 2012/0251851 A1* | 10/2012 | Kim | H01M 2/043 429/61 |

FOREIGN PATENT DOCUMENTS

| | | |
|---|---|---|
| JP | 2001-352666 A | 12/2001 |
| JP | 2002-330540 A | 11/2002 |
| JP | 2003-297205 A | 10/2003 |
| JP | 2003-317702 A | 11/2003 |
| JP | 2005-129442 A | 5/2005 |
| JP | 2006-185708 A | 7/2006 |
| JP | 2007-273221 A | 10/2007 |
| JP | 2008-130458 A | 6/2008 |
| JP | 2010-92874 A | 4/2010 |
| JP | 2011-210717 A | 10/2011 |
| WO | WO2011006663 * | 1/2011 |
| WO | WO 2013/137451 A1 | 9/2013 |

OTHER PUBLICATIONS

Machine translation of JP2007-273221 to Schinichiro et a.; Oct. 2007.*
Machine translation of JP2001-312950 to Toshio et al.; Nov. 2001.*
Office Action issued on Nov. 18, 2014 in the corresponding Japanese Patent Application No. 2014-505033 (with English Translation).
International Search Report mailed May 14, 2013 for PCT/JP2013/057450 filed on Mar. 15, 2013 with English Translation.
U.S. Appl. No. 14/186,451, filed Feb. 21, 2014, Takahashi et al.
Combined Chinese Office Action and Search Report issued Feb. 16, 2016 in Patent Application No. 201380002399.0 (with English translation).
Office Action issued Nov. 17, 2015 in Japanese Patent Application No. 2015-007870 (with English language translation).
Extended European Search Report issued Oct. 8, 2015 in Patent Application No. 13761960.7.
Office Action issued Apr. 26, 2016, in Japanese Patent Application No. 2015-007870 (w/English-language Translation).
Combined Chinese Office Action and Search Report issued Jun. 16, 2015 in Patent Application No. 201380002399.0 (with English language translation).

* cited by examiner

LITHIUM ION SECONDARY BATTERY

CROSS-REFERENCE TO RELATED APPLICATION

This application is a continuation application (CA) based upon and claims the benefit of priority from Japanese Patent Applications No. 2012-059024, filed on Mar. 15, 2012; No. 2012-059025, filed on Mar. 15, 2012; No. 2012-059026, filed on Mar. 15, 2012; and International Application PCT/JP2013/057450, the International Filing Date of which is Mar. 15, 2013 the entire contents of which are incorporated herein by reference.

FIELD

Embodiments described herein relate generally to a lithium ion secondary battery.

BACKGROUND

In recent years, automobiles using secondary batteries as energy sources have been put into practical use, for the reduction of carbon-dioxide emissions, concern over the depletion of fossil fuels such as gasoline. The secondary batteries are required to be high in output power, high in energy density, reduced in size and weight, low in price, or the like, and the improvement in safety and durability is also indispensable for the secondary batteries.

Lithium ion secondary batteries are known as high energy-density secondary batteries for automobiles. The high energy-density lithium ion secondary battery typically has an electrode assembly obtained by rolling up a positive electrode and a negative electrode stacked with a separator interposed therebetween, impregnated with an organic electrolyte solution, and enclosed in a battery can.

Because of the use of an organic electrolyte solution in the lithium ion secondary battery, in the case of reaching an overcharge condition, there is a possibility of not only increasing the battery voltage, but also increasing the pressure gas inside the battery, and further increasing the temperature in the battery, thereby leading to situations such as leakage of the electrolyte solution and rupture of the can. The secondary batteries for automobiles are expected to be subjected to the frequent repetition of charge and discharge, and measures against overcharge are thus taken to ensure safety.

As a conventional measure against overcharge, it is known that when the voltage between terminals of a zener diode exceeds a predetermined range, an opening formed in an exterior member is released by a heat generation unit to discharge gas generated by overcharge from the inside of the exterior member.

In addition, as other measure against overcharge, it is also known that safety is ensured by providing a temperature fuse inside a battery, and providing an overcharge preventer for interrupting a charging current by melting down the temperature fuse when the temperature of an electrode assembly is increased.

DETAILED DESCRIPTION

Figure 1:
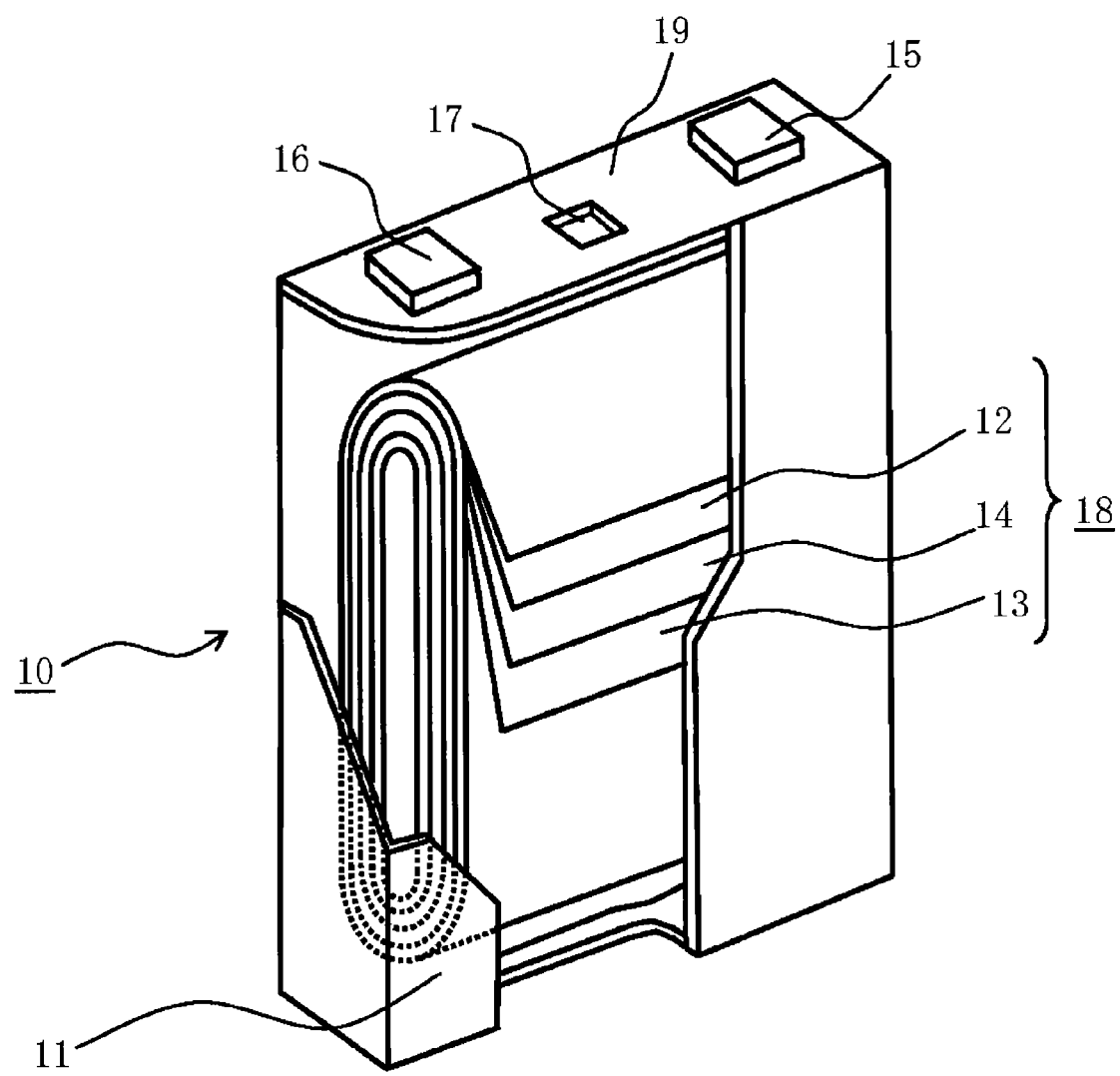
FIG. 1 is a partially cutaway perspective view illustrating a lithium ion secondary battery example according to an embodiment.

A lithium ion secondary battery of an embodiment includes: a battery can; an electrode assembly in the battery can formed by rolling up a positive electrode, a separator and a negative electrode; an organic electrolyte solution in the battery can; a positive electrode lead in the battery can connected to the positive electrode; a negative electrode lead in the battery can connected to the negative electrode; an overcharge preventer in the battery can; a cap body sealing the battery can; a positive electrode terminal fixed to the cap body and connected to the positive electrode lead; and a negative electrode terminal fixed to the cap body and connected to the negative electrode lead. The overcharge preventer includes: a voltage detector configured to detect a voltage equal to or higher than a predetermined value between the positive electrode and negative electrode; a fuse body provided on the positive electrode lead or the negative electrode lead; a switch unit; and a driver configured to drive the switch unit. The fuse body and the switch unit are connected in series to constitute a short circuit for the electrode assembly, and when the voltage between the positive and negative electrodes reaches a predetermined value or higher in the case of charging. The driver is activated by a signal from the voltage detector to close the switch unit, and melt down the fuse body by energy accumulated in the electrode assembly.

[First Embodiment]

The lithium ion secondary battery according to this embodiment is intended to achieve a highly safe and reliable battery with an overcharge preventer placed inside a battery can in the lithium ion secondary battery.

More specifically, this lithium ion secondary battery has: an electrode assembly formed by rolling up a positive electrode, a separator, and a negative electrode; an organic electrolyte solution; a positive electrode lead connected to the positive electrode; a negative electrode lead connected to the negative electrode; and an overcharge preventer, which are incorporated in a battery can sealed with a cap body, and including: a positive electrode terminal fixed to the cap body, and connected to the positive electrode lead; and a negative electrode terminal fixed to the cap body and connected to the negative electrode lead.

Further, the overcharge preventer includes: a voltage detector configured to detect a voltage equal to or higher than a predetermined value between the positive and negative electrodes of the lithium ion secondary battery; a driver activated by a signal from the voltage detector; a switch unit; and a fuse body provided on the positive electrode lead or the negative electrode lead, the fuse body and the switch unit are connected in series to constitute a short circuit for the electrode assembly, and when the voltage between the positive and negative electrodes reaches a predetermined value or higher in the case of charging, the driver is activated by a signal from the voltage detector to close the switch unit, and melt down the fuse body by energy accumulated in the electrode assembly.

The voltage detector of the overcharge preventer includes a circuit including a zener diode, a rectifier diode, or a comparator.

In addition, the switch unit includes, for example, a positive electrode lead and a negative electrode lead opposed to each other, and an insulating resin film therebetween, a push force is always exerted between the positive electrode lead and the negative electrode lead, when an overcharge condition is detected by the voltage detector, the embodiment can be achieved in such a way that a resistance heater such as a resistance heating wire, placed near the resin film, generates heat with a current from the voltage detector to soften or melt the insulating resin film, bring the positive electrode lead and the negative electrode lead into contact with each other, thereby closing the short circuit, melt down the fuse body, thereby interrupting the charging current.

The push force is suitably generated by means such as a spring material, a magnet, or a pressure switch.

The insulating resin film preferably has an end fixed, and the other end with a pull force applied thereto by a spring material. This condition can promote softening or melting of the insulating resin film to ensure the contact with the positive electrode lead and the negative electrode lead.

The voltage detector is preferably coated with a solvent-resistance and insulating resin. This coating can achieve a highly reliable overcharge preventer without any possibility of corrosion or the like even under the environment of an organic electrolyte solution in a battery can.

The lithium ion secondary battery according to the present embodiment will be described below in detail with reference to the drawings.

[Structure]

Figure 2:
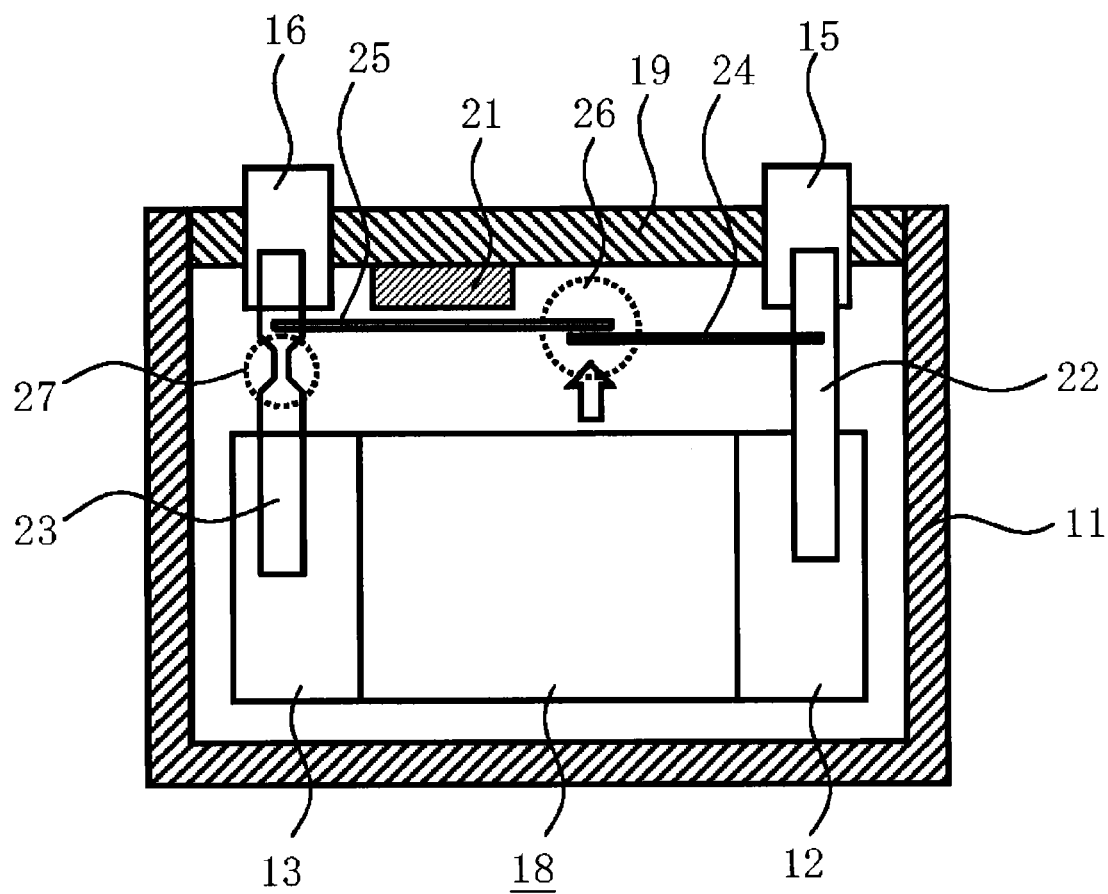
FIG. 2 is a cross-sectional view illustrating the lithium ion secondary battery example according to the embodiment.

FIGS. 1 and 2 show, respectively in the partially cutaway perspective view and the cross-sectional view therein, a structure example of the lithium ion secondary battery according to the present embodiment. In FIGS. 1 and 2, common members are denoted by the same reference numerals.

As seen in FIGS. 1 and 2, the battery 10 includes a battery can 11 in the shape of a hollow circular cylinder with a bottom, a hollow cuboid with a bottom, or a hollow cube with a bottom, which includes an opening, and the opening includes a cap body 19 placed for sealing the opening. This cap body 19 is provided with terminals 15, 16 for electric current extraction, which are connected to a positive electrode 12 and a negative electrode 13 inside via electrode leads 22, 23 such as aluminum foil. The positive electrode 12 and the negative electrode 13 are formed by applying a positive electrode active material and a negative electrode active material respectively on surfaces of thin metal foil. Between the both electrodes, an ion-permeable separator 14 for insulation is stacked on one another, rolled up, shaped so as to be able to be housed in the can body 11 to make up an electrode assembly 18, which is housed in the battery can 11 along with an electrolyte solution, not illustrated.

The cap body 19 at the opening of the battery can 11 can be further provided with a gas release valve 17, so as to be able to release internal gas when the internal pressure in the battery is increased.

In addition, an electronic circuit (voltage detector) 21 constituting at least a part of the overcharge preventer is coated so as not to be adversely affected by an organic electrolyte solution filling the inside of the battery can, and fixed to the cap body 19, and placed inside the battery can.

Each configuration requirement will be further described below.

(Battery Can)

The battery can 11 has the shape of a hollow circular cylinder with a bottom, a hollow cuboid with a bottom, or a hollow cube with a bottom, which has an opening, which is obtained by shaping a metal such as aluminum. The battery can 11 filled inside with an organic electrolyte solution, can be made of such a material that is not chemically reacted with the organic electrolyte solution, or subjected inside to resin coating for insulation.

(Cap Body)

The cap body 19 includes an exterior of a metal plate material such as aluminum, and further, an interior can be formed from an insulating plate material such as polypropylene. The cap body 19 is hermetically fixed to the opening of the battery can 11 by means such as laser welding. The cap body 19 includes at least two openings formed, which are respectively provided with the positive electrode terminal 15 and the negative electrode terminal 16. Furthermore, if necessary, the cap body 19 may be provided with the gas release valve 17 for releasing gas when the internal pressure is increased.

The electronic circuit constituting at least a part of the overcharge preventer is fixed to the inner battery-can side of the cap body. The possibility of wiring disconnection or the like due to vibration in the use of the battery can be resolved by fixing the electronic circuit.

The cap body 19 may be joined to and integrated with the positive and negative electrode leads before the step of assembling the battery. This integration can improve the work efficiency of the manufacturing process. In addition, likewise, the overcharge preventer is also preferably integrated.

(Electrode Assembly)

The electrode assembly 18 is formed in such a way that the positive electrode 12, the negative electrode 13, and the separator 14 can be stacked on one another, rolled up, and housed in the battery can 11 as described previously.

The positive and negative electrodes 12, 13 of the electrode assembly 18 have ends formed by rolling up so as to be protruded from the separator 14, leads 22, 23 for electrode extraction are electrically connected to the protruded positive and negative electrodes by means such as welding, and the leads 22, 23 are electrically connected to the positive and negative electrode terminals 15, 16 of the cap body.

(Positive Electrode)

The positive electrode is prepared by, for example, applying slurry containing a positive electrode active material to a current collector of aluminum foil or aluminum alloy foil.

As the positive electrode active material, which is not to be considered particularly limited, oxides, sulfides, polymer, and the like can be used which can store and release lithium. Preferred active materials include lithium-manganese complex oxides, lithium-nickel complex oxides, lithium-cobalt complex oxides, and lithium iron phosphate, which achieves high positive electrode potentials.

(Negative Electrode)

The negative electrode is prepared by applying slurry containing a negative electrode active material to a current collector of aluminum foil or aluminum alloy foil.

As the negative electrode active material, which is not to be considered particularly limited, metal oxides, metal sulfides, metal nitrides, alloys, and the like can be used which can store and release lithium, and preferably, the negative electrode active material is a material that has an electric potential of 0.4 V or higher for storing or releasing lithium ions with respect to the electric potential of metal lithium. This negative electrode active material which has an electric potential for storing or releasing lithium ions suppresses the alloying reaction between aluminum or an aluminum alloy and lithium, thereby allowing the use of aluminum or an aluminum alloy for the negative current collector and constituent members related to the negative electrode. Examples thereof include, for example, titanium oxides, lithium-titanium oxides, tungsten oxides, amorphous tin oxides, tin-silicon oxides, and silicon oxides, and above all, lithium-titanium complex oxides are preferred.

(Separator)

Microporous membranes, woven fabrics, non-woven fabrics, laminated products of the same material or different materials thereof, and the like can be used as the separator. Examples of the material forming the separator can include such as polyethylene, polypropylene, ethylene-propylene copolymers, and ethylene-butene copolymers.

(Electrolyte Solution)

For the electrolyte solution, a non-aqueous electrolyte solution is used which is prepared by dissolving an electrolyte (for example, a lithium salt) in a non-aqueous solvent. Examples of the non-aqueous solvent can include, for example, ethylene carbonate (EC), propylene carbonate (PC), butylene carbonate (BC), dimethyl carbonate (DMC), diethyl carbonate (DEC), ethylmethyl carbonate (EMC), γ-butyrolactone (γ-BL), sulfolane, acetonitrile, 1,2-dimethoxyethane, 1,3-dimethoxypropane, dimethyl ether, tetrahydrofurane (THF), 2-methyltetrahydrofuran. The non-aqueous solvents may be used independently, or two or more thereof may be mixed for use. Examples of the electrolyte can include lithium salts such as, for example, lithium perchlorate ($LiClO_4$), lithium hexafluorophosphate($LiPF_6$), lithium tetrafluoroborate ($LiBF_4$), lithium hexafluoroarsenate ($LiAsF_6$), and lithium trifluoromethanesulfonate ($LiCF_3SO_3$). The electrolytes may be used independently, or two or more thereof may be mixed for use. The amount of the electrolyte dissolved in the non-aqueous solvent is desirably 0.2 mol/L to 3 mol/L.

The materials mentioned for the positive electrode, negative electrode, separator, or organic electrolyte solution are absolutely by way of example only, and the present embodiment is not to be considered limited to these materials.

(Overcharge Preventer)

The lithium ion secondary battery is required to promptly interrupt current in order to ensure safety for the battery, in such conditions as overcharge. As a phenomenon in the case of overcharge, phenomena occur such as an increase in voltage, a temperature increase in the battery, or an increase in internal pressure. Thus, the overcharge preventer can be achieved by detecting these phenomena with a sensor, and correspondingly interrupting current.

The overcharge preventer according to this embodiment includes: a voltage detector as an overcharge condition monitor; and a short-circuit closer that closes the short-circuit to cut off the fuse body. This short-circuit closer is configured to include a switch unit that opens or closes the circuit, and a driver that drives the switch unit.

These components can be configured at least partially as an electronic circuit that achieves a required function with an electronic component mounted on a circuit wiring substrate.

When the respective components of the overcharge preventer each includes an electronic circuit, the electronic circuit is hermetically surrounded by and coated with a laminate material, and firmly fixed to the cap body. This can place the overcharge preventer in the battery can without being affected by the organic electrolyte solution, thereby allowing the prompt detection of overcharge conditions, and ensuring the operation of the safety device.

In the lithium ion secondary battery according to the present embodiment, the laminate material preferably has corrosion resistance to the electrolyte solution, and serves as a barrier against the electrolyte solution, and includes a single-layer or multi-layer resin film, or a composite laminated film of a single-layer or multi-layer resin film laminated on aluminum foil as a base material.

In place of the laminate film coating, a required portion of the electronic circuit can be also coated with an insulating resin to form an insulating film. Furthermore, the electronic circuit can be also insulated with a resin mold. In addition, there is also a method of isolating the overcharge preventer itself from the electrolyte solution. For example, a similar effect can be expected by a method of dividing the battery can into two rooms and placing the electrode assembly including the electrolyte solution and the overcharge preventer in the separate rooms, or a method coating and protecting the electrode assembly including the electrolyte solution with a laminate film.

(Voltage Detector)

The detection of an overcharge condition can be achieved by detecting an increase in charging voltage, a temperature increase in the battery, an internal pressure increase in the battery, or the like as described previously. These detections are achieved with a voltage detecting device, a temperature measuring device, a pressure sensor, or the like.

In the present embodiment, a unit that makes a determination depending on the charging voltage is employed as the unit that detects an overcharge condition. This is because in the lithium ion secondary battery according to the present embodiment, which includes the negative electrode of lithium titanate and the positive electrode based on manganese dioxide, the increase in temperature and the increase in internal pressure are not significant even in the case of reaching an overcharge condition, there is a possibility that the overcharge condition will be far advanced upon the detection of these abnormalities, and it is difficult to achieve high reliable detection of overcharge conditions.

This voltage detector is intended to measure the voltage between the terminals of the main body in the lithium ion secondary battery, and determine an overcharge condition in the case of exceeding a reference voltage. This unit can be achieved with, for example, a zener diode, a rectifier diode, a comparator, or the like.

(Short-Circuit Closer)

Figure 4:
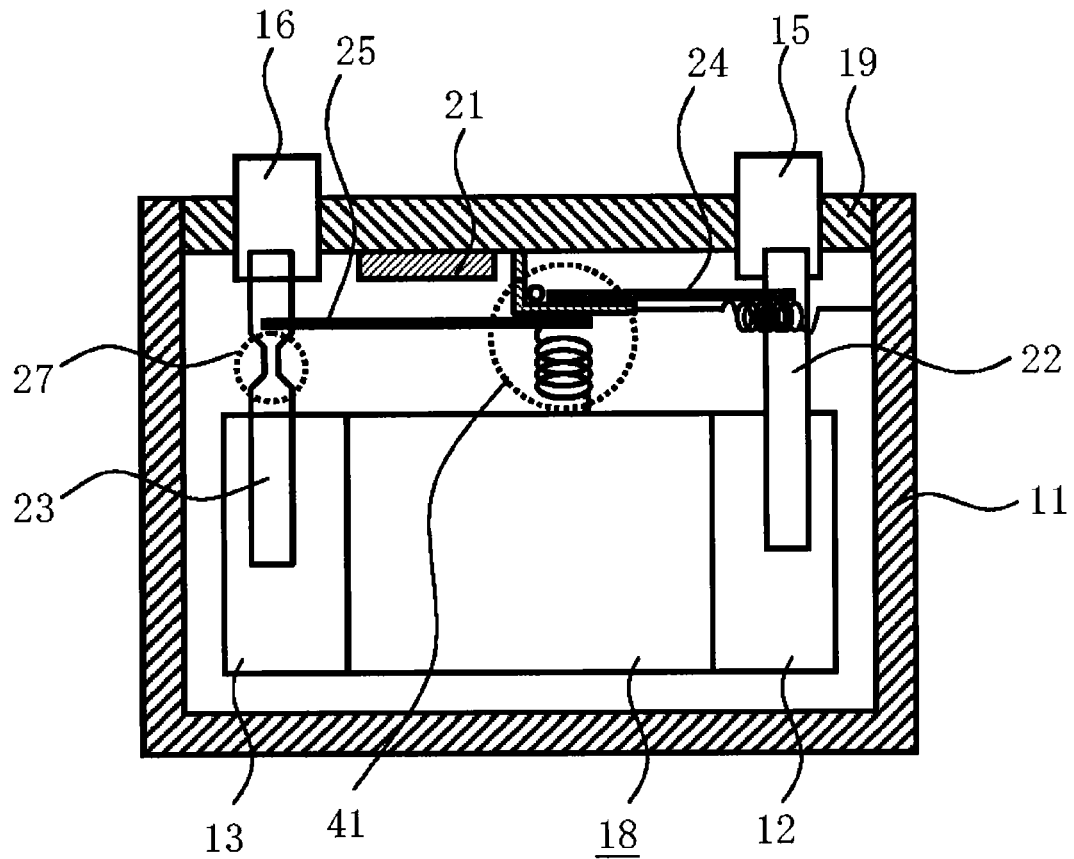
FIG. 4 is a cross-sectional view illustrating, in more detail, a lithium ion secondary battery example according to an embodiment.

In FIG. 4 which is a cross-sectional view illustrating an example of the lithium ion secondary battery according to the present embodiment, a region 41 surrounded by a dotted line is a main section. As seen in the figure, the short-circuit closer can include: a switch unit formed of the positive electrode lead 24 and negative electrode lead 25 out of contact with each other in a normal condition of the battery; a driver such as a spring material that brings the leads into contact with each other in an overcharge condition; and a driver controlling device that controls the operation of the driver. In short, the driver and the control device therefor are configured to activate the switch unit and close the short circuit in accordance with a signal from the voltage detector.

As illustrated in FIG. 2, in the lithium ion secondary battery according to the present embodiment, a switch unit 26 is configured to spatially isolate the positive electrode lead 24 and the negative electrode lead 25 from each other, or have the leads opposed to each other with an insulating film interposed therebetween. The driver formed of a spring material or the like is placed close to the switch unit, and the switch unit is closed when the short-circuit closer is activated.

In the case of the switch unit out of contact by the isolation, the driver is biased to bring the switch unit into a contact state when the short-circuit closer is activated.

In addition, when the insulating film is interposed between the leads of the switch unit, the positive electrode lead and the negative electrode lead are subjected to pressure welding in advance with a biasing unit such as a spring member. Then, in an overcharge condition detected, the resin film can be melted or softened on heating by the resistance heater to bring the positive electrode lead and the negative electrode lead in contact with each other for short circuit, or the insulating film can be moved to bring the leads in contact with each other for short circuit.

In the embodiment described above, the both leads may be subjected to pressure welding with the use of a pair of magnets in place of the spring material.

As the switch unit, besides the formation of the closed circuit with the positive electrode lead and negative electrode lead in direct contact with each other as previously described, there is also a method of forming a closed circuit with the positive electrode lead and negative electrode lead electrically connected with the battery can interposed therebetween. Furthermore, in order to reduce the contact resistance of the switch, a surface treatment, for example, plate processing can be also applied.

Figure 5:
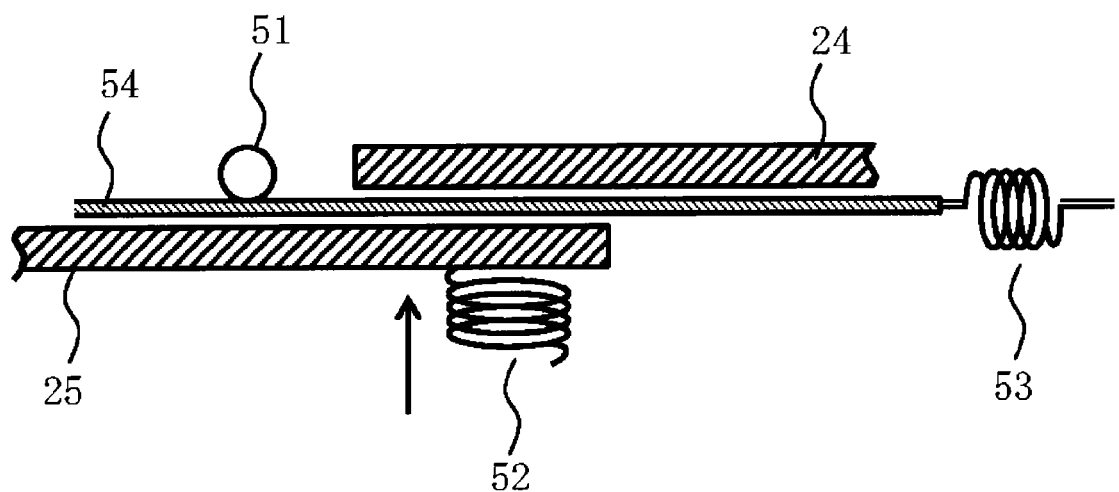
FIG. 5 is an enlarged cross-sectional view of a main section illustrating an example of the short-circuit closer in FIG. 4.
Figure 6:
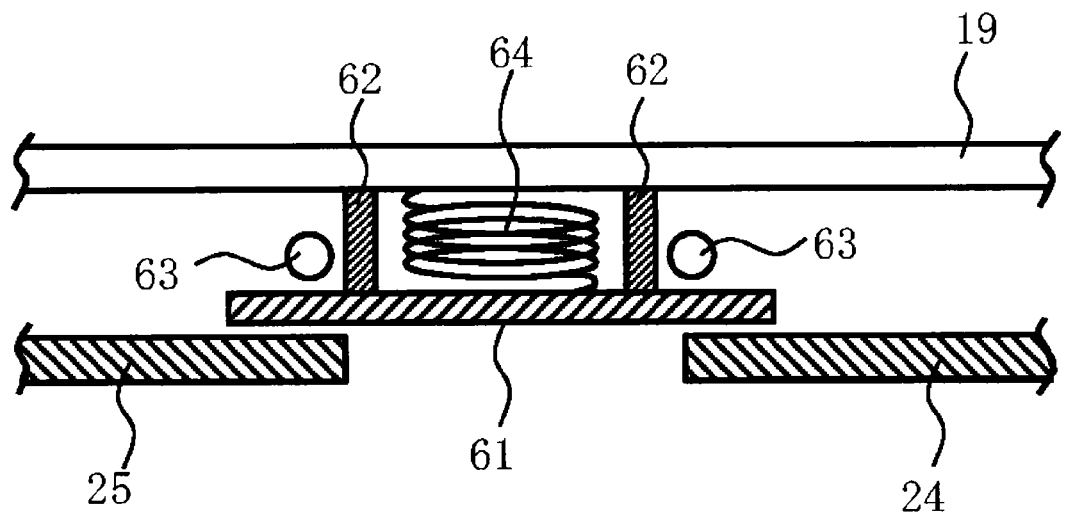
FIG. 6 is an enlarged cross-sectional view of a main section illustrating another example of the short-circuit closer in FIG. 4.

While specific examples of the short-circuit closer are illustrated in FIGS. 5 and 6, the mechanism will be described in detail in examples as will be descried later.

(Fuse Body)

The fuse body may be a fuse of a commercially available low-melting-point metallic wire rod, or formed by providing the positive electrode lead 23 or negative electrode lead 22 partially with a thin part as illustrated in FIG. 2 so that fuse body is melted down the electrical resistance of the lead.

(Operation of Overcharge Preventer)

Figure 3:
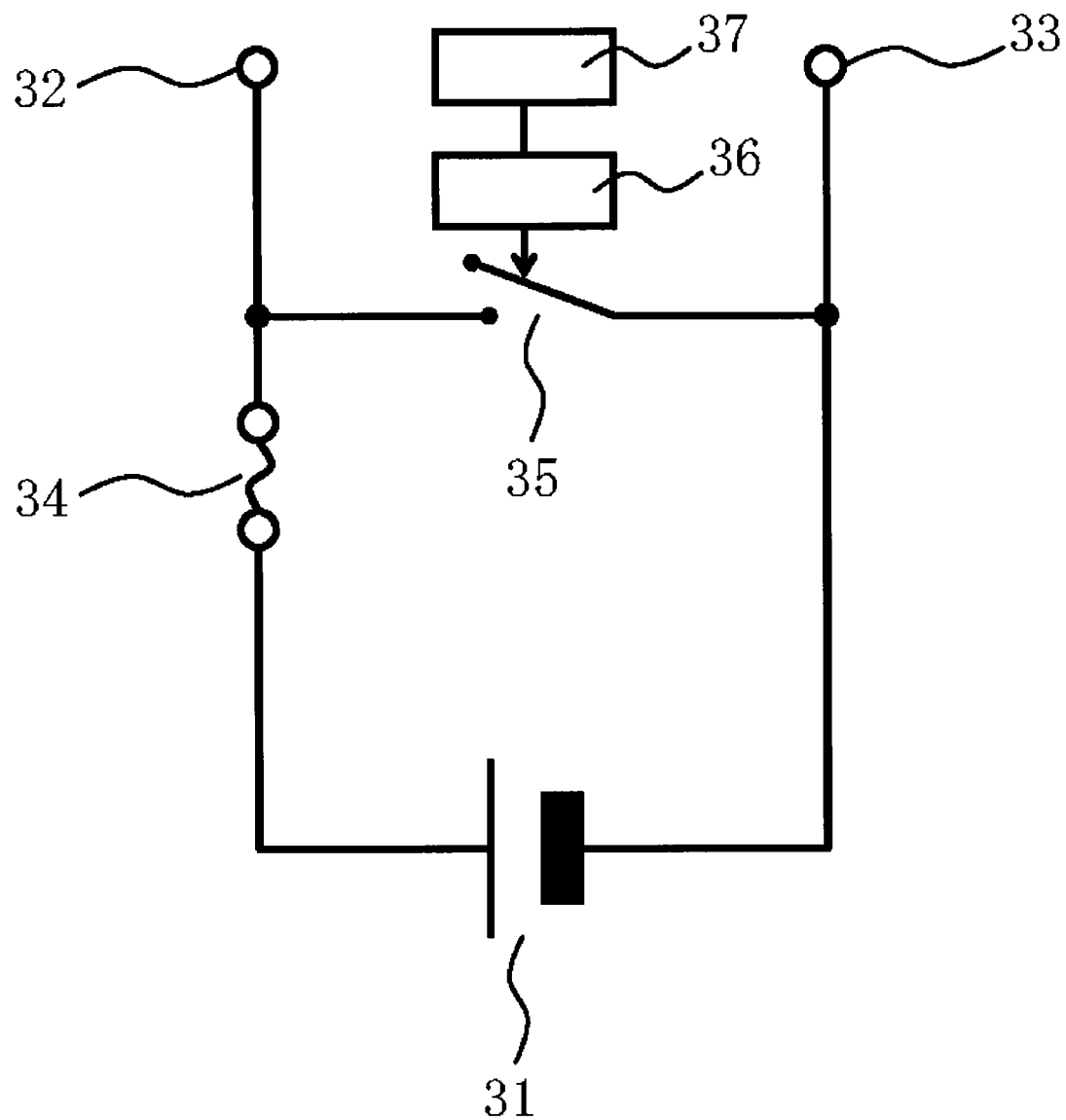
FIG. 3 is a conceptual diagram for explaining the operation of an overcharge preventer according to an embodiment.

The operation of the overcharge preventer will be described with reference to FIG. 3.

This overcharge preventer includes a fuse body 34, a switch unit 35, a driver 36 that drives the switch unit, a voltage detector 37, or the like, and connected to a power generation body 31 of the lithium ion secondary battery according to the present embodiment. In the case of normally charging the lithium ion secondary battery, an external charging power supply is connected to the external terminals 15, 16 to supply charging power to the electrode assembly. In this case, the switch unit 35 is closed.

When the power generation body 31 of the lithium ion secondary battery reaches an overcharge condition, a signal indicating the overcharge condition is supplied to the driver 36 from the voltage detector 37 as a overcharge condition monitor, and the operation of the driver drives the switch unit 35 to close the short circuit.

Thus, the short circuit is formed which is routed from the power generation body 31 of the lithium ion secondary battery through the switch unit 35 and the fuse body 34, a large current is allowed to flow through the circuit instantaneously by energy accumulated in the lithium ion secondary battery, the fuse body 34 is melted down by heat generated by the resistance of the fuse body 34, thereby interrupting the charging current.

[Second Embodiment]

While the function of the overcharge preventer melts down the fuse body so as to interrupt the charging current in the case of falling into an overcharge condition while charging the lithium ion secondary battery in the embodiment described above, energy for charge is accumulated and left in the power generation body of the lithium ion secondary battery even when such a measure is taken. In the case of disposing such a battery, there is a possibility that fire will occur due to the rapid release of energy on the occurrence of any event such as short circuit between the battery electrodes.

The present embodiment is intended to achieve a mechanism for safely releasing remaining energy in a lithium ion secondary battery in an overcharge condition.

Figure 7:
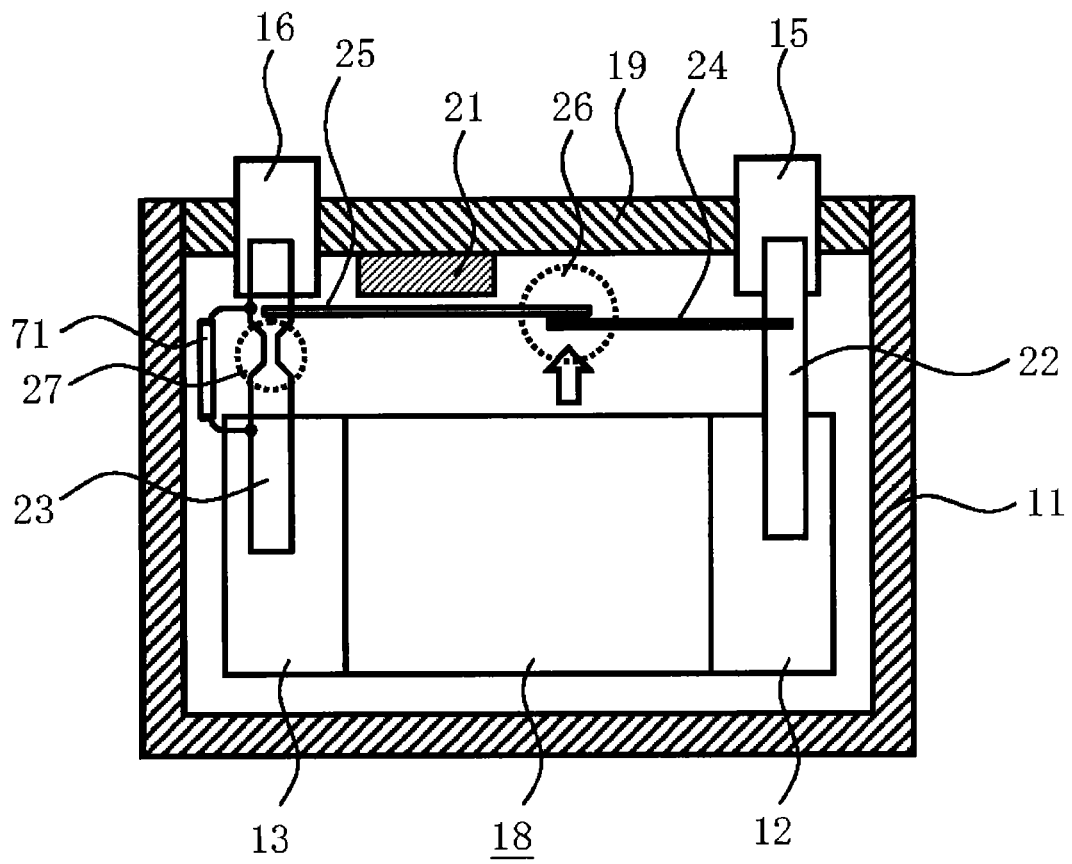
FIG. 7 is a cross-sectional view illustrating a lithium ion secondary battery according to a second embodiment.

The lithium ion secondary battery according to the present embodiment is characterized in that a resistance element 71 is connected in parallel with a fuse body 27 as illustrated in FIG. 7, in addition to the battery configuration according to the first embodiment as illustrated in FIG. 2.

Figure 8A:
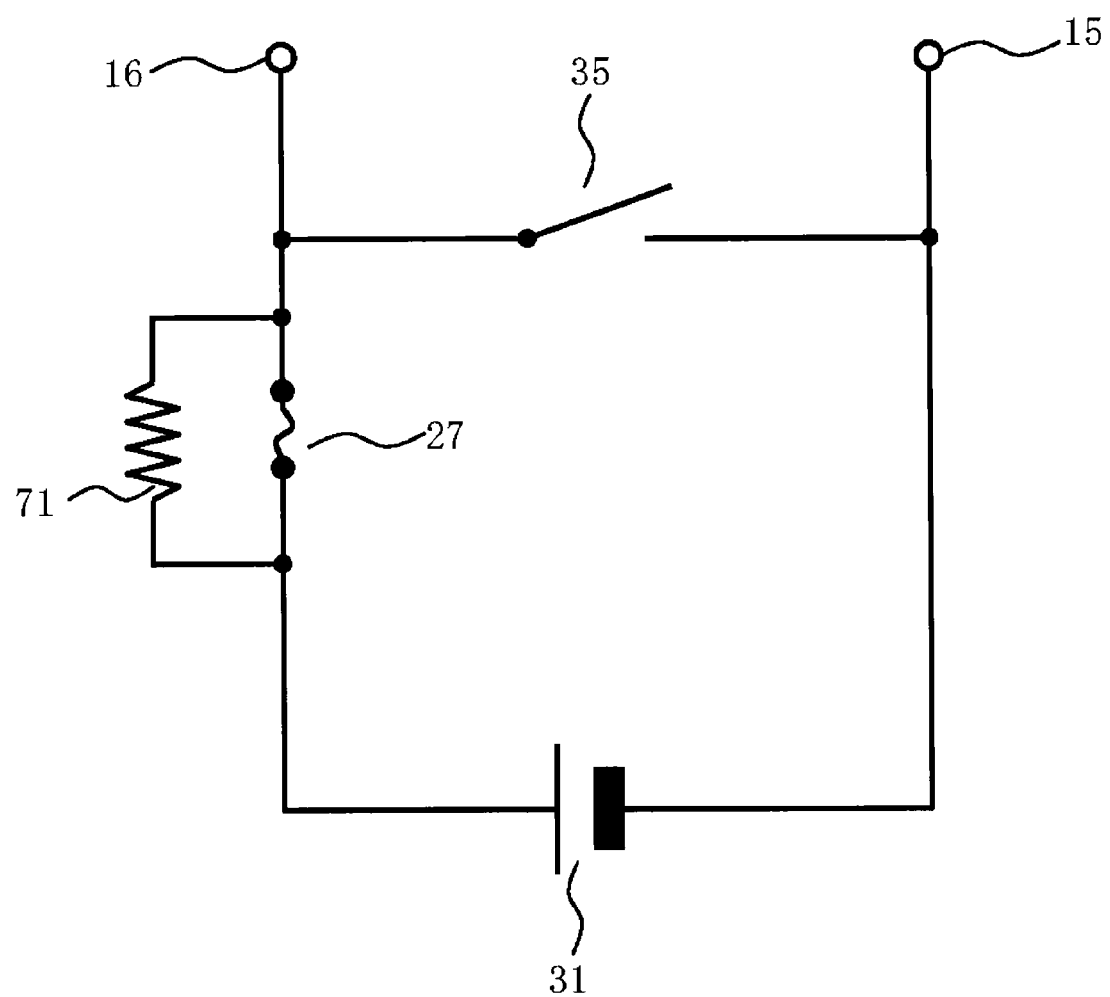
FIGS. 8A and 8B are circuit diagrams illustrating the operation of the lithium ion secondary battery according to the second embodiment.
Figure 8B:
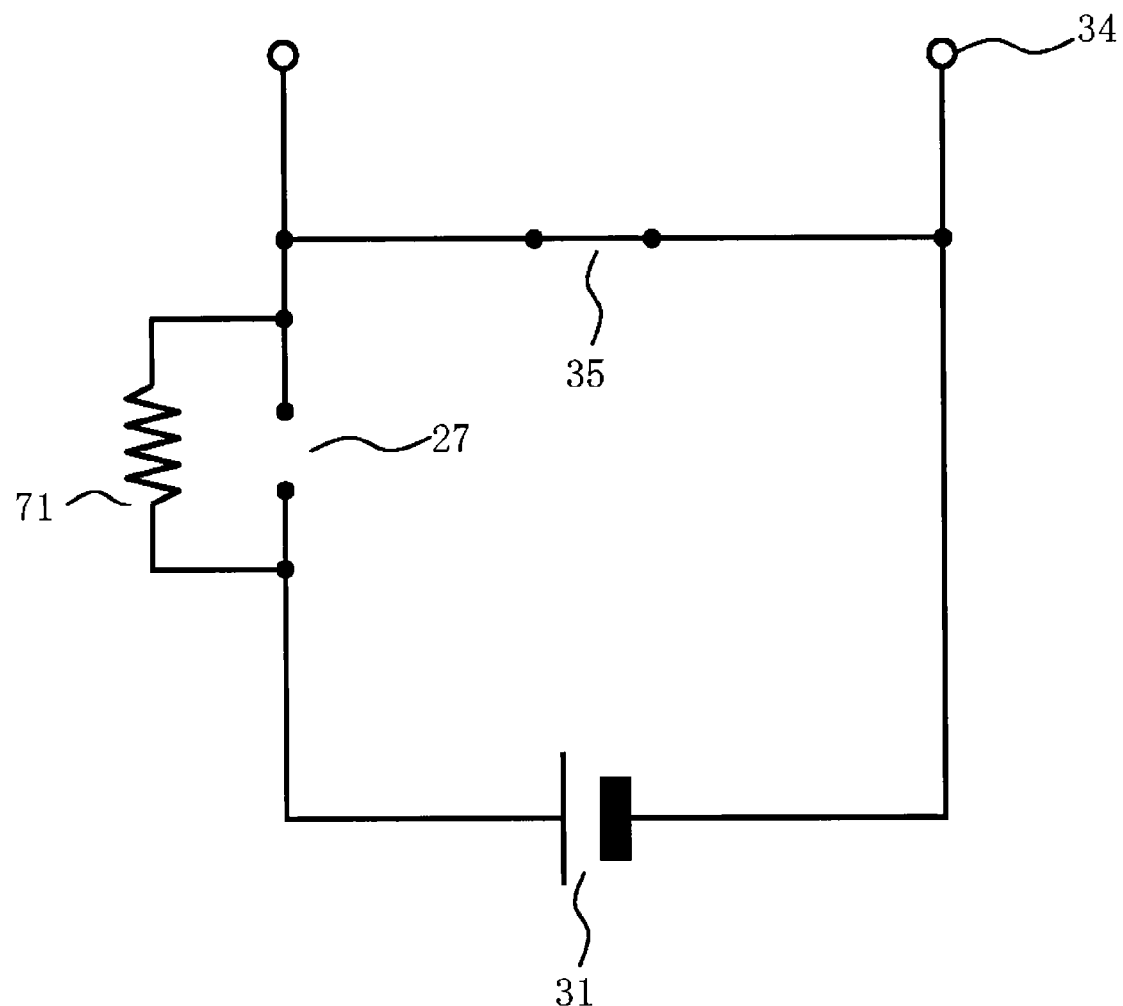

The operation of the lithium ion secondary battery according to the present embodiment will be described with reference to FIGS. 8A and 8B as circuit diagrams. FIG. 8A illustrates a normal charge condition of the lithium ion secondary battery according to the present embodiment. In addition, FIG. 8B illustrates a circuit condition after the activation of an overcharge preventer in an overcharge condition. In FIG. 8A, the resistor 71 is connected in parallel with the fuse body 27 as described above. The resistor 71 has a much higher resistance than the fuse body 27, and the charging current from a power supply connected to terminals 15, 16 is thus supplied through the fuse body 27 to a power generation body 31 without passing through the resistor 71.

On the other hand, upon detecting the power generation body 31 in overcharge state, the function of the overcharge preventer melts down the fuse body 27 to form a circuit with the power generation body 31, switch unit 35, and resistor 71 connected in series as described previously.

In this circuit, energy accumulated in the power generation body 31 will be consumed through the resistor 71 to release the energy in the lithium ion secondary battery.

In the embodiment described above, the resistance value of the resistor is 10000 times or more as high as compared with the resistance value of the fuse body.

This is because if the resistance value of the resistor falls outside this range, there is a possibility that when the switch unit 35 is turned on, current flowing through the fuse body 27 will partially flow through the resistor 71 to decrease the heat generation of the fuse body and impair the current interrupting function. Moreover, when this resistance value is increased, the amount of heat generation will be increased during energy release, there is no denying the possibility that any event will occur which is not envisioned, and in order to safely release energy, the resistance value is preferably increased.

EXAMPLE 1

The embodiment will be described below in detail with an example with reference to FIG. 4 and FIG. 5 which is an enlargement of the short-circuit closer section in FIG. 4.

The lithium ion secondary battery according to the present embodiment is intended to detect an overcharge condition from an increase in voltage.

First, an electrode assembly was created by the following method.

A positive electrode active material of $LiCoO_2$ and a solution of polyvinylidene fluoride dissolved in N-methylpyrrolidon were mixed to prepare a paste-like positive electrode coating material. This paste-like positive electrode coating material was passed through a 70-mesh net to remove large clusters, then applied to both two sides of a positive electrode current collector made of strip-shaped aluminum foil of 12 μm in thickness, except for a current collecting tab, and dried to form a coating film. The dried strip-shaped body was subjected to press forming, and cut into a predetermined size to obtain a positive electrode.

A negative electrode active material of $Li_4Ti_5O_{12}$ was mixed into a solution of polyvinylidene fluoride dissolved in N-methylpyrrolidon to a paste-like negative electrode coating material. This paste- like negative electrode coating material was passed through a 70-mesh net to remove large clusters, then applied to both two sides of a negative electrode current collector made of strip-shaped aluminum foil of 12 μm in thickness, except for a current collecting tab, and dried to form a coating film. The dried strip-shaped body was subjected to press forming, and cut into a predetermined size to obtain a negative electrode.

A separator made of polyethylene resin was placed between the strip-shaped positive electrode and negative electrode obtained as described above, and rolled up to prepare the electrode assembly 18.

Then, aluminum plate materials to serve as the positive and negative electrode leads 22, 23 were jointed to a plate material to serve as a lid section of the cap body 19 made of aluminum. The positive electrode lead 24 was used for 70 mm in length and 10 mm² in cross-sectional area, whereas the negative electrode lead 25 was used for 20 mm in length and 10 mm² in cross-sectional area. The negative electrode lead is provided, at a point thereof, with a smaller part in cross-sectional area (3 mm² in cross-sectional area) to form the fuse body 27. Aluminum was used for the positive and negative electrode terminals.

On the cap body 19, the electronic circuit (voltage detector) 21 that detects the increase in charging voltage was coated with an aluminum laminate film material, and hermetically fixed. The electronic circuit was achieved with a comparator for comparing a reference voltage with the charging voltage applied.

The negative electrode lead 25 was extracted between the fuse body 27 and the negative electrode terminal 16, whereas the positive electrode lead 24 was extracted from the positive electrode lead 22, thereby making these leads accessible as a switch unit. While this switch unit is always opened, electrical conduction was provided by an actuator, not illustrated, in accordance with a driving signal from the electronic circuit 19 when the battery falls into an overcharge condition. As a result, a short circuit is formed which was routed from the positive electrode 12 of the electrode assembly 18, through the positive electrode lead 22, the positive electrode lead 24, the switch unit 26, the negative electrode lead 25, the negative electrode lead 23, the fuse body 27, the negative electrode lead 23, and the negative electrode 13, thereby allowing a large current from the battery to flow to melt down the fuse body and interrupt the charging current.

FIG. 5 illustrates a detailed example of the switch unit and driver described above. FIG. 5 is an enlarged view of a main section of the switch unit and driver. In FIG. 5, the positive electrode lead 24 and the negative electrode lead 25 are partially opposed to each other. A resin insulating film 54 that is able to be melted down by heating is placed between the positive electrode lead 24 and the negative electrode lead 25, for keeping the positive electrode lead 24 and the negative electrode lead 25 from coming into contact with each other.

This resin insulating film 54 has an end fixed, and the other end with a pull force applied thereto by a spring material 53. A resistance heating wire 51 such as a nichrome wire is placed near the fixed end of the resin insulating film 54, and the resistance heating wire 51 is connected to the driving circuit so as to be heated by applying current in accordance with a driving signal in the case of overcharge. In addition, the positive electrode lead 24 and the negative electrode lead 25 are always pushed against each other by a spring material 52.

When driving power is supplied to the resistance heating wire 51 in the case of overcharge, the resin insulating film 54 is heated, and thereby melted down, and the resin insulating film 54 will move to the right-hand end in FIG. 5 to bring the positive electrode lead 24 and the negative electrode lead 25 into contact with each other, bring the positive electrode lead 24 and the negative electrode lead 25 into a conduction state, and supply a large current to the fuse body.

SUS304 resistant to the electrolyte solution was used for the spring material. For the insulating resin, a PPS resin was used which was resistant to the electrolyte solution and less likely to be stretched even under the load caused by the pull force of the spring material.

Ethylene carbonate and propylene carbonate were mixed at a volume ratio of 1:2, and $LiPF_6$ was dissolved for a concentration of 1 mol/L in the obtained mixed solvent to prepare a non-aqueous electrolyte. The liquid of the obtained non-aqueous electrolyte was injected into the rectangular battery can 11 made of aluminum.

Then, the electrode assembly 18 obtained in the step described above was electrically connected to the positive and negative electrode leads integrated with the cap body 19, housed in the battery can 11, and then sealed.

In the way just described, a non-aqueous electrolyte lithium ion secondary battery was produced which was 20 Ah in capacity.

The obtained lithium ion secondary battery was subjected to an overcharge test in which a current corresponding to 1C (20 A) was supplied from the condition of SOC 100% (2.7 V) under an environment at 25° C. For the voltage detector, a comparator was used, and the threshold value of the detection voltage was set to 3.5 V.

As a result of this charging test, an increase in voltage was detected 2 minutes 40 seconds after the start of charging, and the fuse body was melted down to stop the charging. In this case, the temperature increase of the battery can was less than 10° C. (the temperature was 35° C. or lower), and the battery was not changed in shape, except the meltdown of the fuse body.

On the other hand, a comparative experiment was carried out with the use of the same battery as in the example described above, except for the use of a cap body including a gas release valve, and for the omission of the other overcharge preventer. As a result, the maximum temperature of the battery can reached 342° C., the gas release valve was activated 40 minutes after the start of charging, and the battery was ruptured.

EXAMPLE 2

In place of the switch driving mechanism employed in Example 1 described above, a switch unit mechanism with the use of a shorting plate can be also employed. Example 2 herein is illustrated in FIG. 6. FIG. 6 is a cross-sectional view partially illustrating a short-circuit closer section of the overcharge preventer described above.

In FIG. 6, reference numeral 19 denotes a cap body. The positive electrode lead 24 and the negative electrode lead 25 are placed apart from each other inside the battery can with the cap body 19. A spring material 64 is firmly fixed to the bottom of the cap body 19, and this spring material 64 pushes a shorting plate 61 in a direction away from the cap body 19. The shorting plate 61 is made of a piece of metal, and brought into contact with the positive electrode lead 24 and the negative electrode lead 25 form a conduction path routed through the positive electrode lead 24, the shorting plate 61, and the negative electrode lead 25. The shorting plate 61 is normally pulled by a meltable member 62 such as a resin film to the cab body 19 against the push force of the spring material 64, so as to be kept from coming into contact with the positive electrode lead 24 and the negative electrode lead 25. A resistance heating wire 63 is placed near the meltable member 62. This resistance heating wire which is connected to a driver control circuit, not illustrated, generates heat by power supplied from the driver control circuit in the case of overcharge to heat and thereby melt down the meltable member 62. As a result, the shorting plate 61 comes, with the elastic force of the spring material 64, into contact with the positive electrode lead 24 and the negative electrode lead 25 to form a conduction path. Thus, as in the case of Example 1 described previously, a large current will be allowed to flow through a fuse body, not illustrated, by power accumulated in the lithium ion secondary battery, and the fuse body will be melted down to interrupt the charging current.

While the several embodiments and examples of the present invention have been described above, these embodiments are presented by way of example, and not intended to limit the scope of the invention. The embodiments can be implemented in various other ways, and various omissions, substitutions, and modifications can be made without departing from the spirit of the invention. The embodiments and variations thereof are considered to fall within the scope and spirit of the invention, as well as within the invention as set forth in the claims and equivalents thereof.

What is claimed is:

1. A lithium ion secondary battery comprising:
   a battery can;
   an electrode assembly in the battery can formed by rolling up a positive electrode, a separator and a negative electrode;
   an organic electrolyte solution in the battery can;
   a positive electrode lead in the battery can connected to the positive electrode;
   a negative electrode lead in the battery can connected to the negative electrode;
   an overcharge preventer in the battery can;
   a cap body sealing the battery can;
   a positive electrode terminal fixed to the cap body and connected to the positive electrode lead; and
   a negative electrode terminal fixed to the cap body and connected to the negative electrode lead,
   wherein the overcharge preventer comprises: a voltage detector configured to detect a voltage equal to or higher than a predetermined value between the positive electrode and negative electrode; a fuse body provided on the positive electrode lead or the negative electrode lead; a switch unit; and a driver configured to drive the switch unit, the fuse body and the switch unit are connected in series to constitute a short circuit for the electrode assembly,
   the switch unit comprises a positive electrode sub lead and a negative electrode sub lead opposed to each other, and an insulating resin film placed between the positive electrode sub lead and the negative electrode sub lead,
   the positive electrode sub lead is connected to the positive electrode,
   the negative electrode sub lead is connected to the negative electrode,
   a push force is always applied in a direction of bringing both of the positive electrode sub lead and the negative electrode sub lead into contact with each other between the positive electrode sub lead and the negative electrode sub lead,
   the insulating resin film insulates the positive electrode sub lead and the negative electrode sub lead and contacts with the positive electrode sub lead and the negative electrode sub lead when the short circuit is open,
   when the voltage between the positive and negative electrodes reaches the predetermined value or higher in the case of charging, the driver is activated by a signal from the voltage detector to close the switch unit, and melt down the fuse body by energy accumulated in the electrode assembly, and
   wherein the insulating resin film has one end fixed, and one end opposite the fixed end with a pull force applied thereto by a spring material.

2. The battery according to claim 1, wherein the overcharge preventer is activated by detecting the voltage inside the battery can.

3. The battery according to claim 1, wherein the voltage detector includes a zener diode, a rectifier diode, or a comparator.

4. The battery according to claim 1, wherein the push force is applied by a spring material or a magnet.

5. The battery according to claim 1, wherein a resistance heater placed near the resin film is configured to generate heat with a current from the voltage detector, soften or melt the resin film, and bring the positive electrode sub lead and the negative electrode sub lead into physical contact with each other.

6. The battery according to claim 1, wherein the switch unit is driven by the driver so as to come into contact with the positive electrode sub lead and the negative electrode sub lead, when a voltage between the positive electrode and the negative electrode reaches the predetermined value or higher while charging the battery.

7. The battery according to claim 1, wherein the overcharge preventer is at least partially coated and sealed with a solvent-resistance and insulating resin.

8. The battery according to claim 7, wherein the solvent-resistance and insulating resin is a laminate material.

9. The battery according to claim 8, wherein the laminate material comprises a single-layer or multi-layer resin, or a laminated body of a single-layer or multi-layer resin film laminated on aluminum foil as a base material.

10. The battery according to claim 1, wherein a resistance element is connected in parallel with the fuse body.

11. The battery according to claim 10, wherein the resistance value of the resistance element is 10000 times or more as high as the resistance value of the fuse body.

12. The battery according to claim 1, wherein the short circuit is closed by softening or melting the insulation resin and physically connecting the positive electrode sub lead and the negative electrode sub lead.

* * * * *